United States Patent
Wang et al.

(10) Patent No.: US 7,067,585 B2
(45) Date of Patent: Jun. 27, 2006

(54) HOT MELT ADHESIVE COMPOSITION BASED ON A RANDOM COPOLYMER OF ISOTACTIC POLYPROPYLENE

(75) Inventors: Baoyu Wang, Waukesha, WI (US); Monina Dadap Kanderski, Milwaukee, WI (US); Lacretia A. Svenningsen, Wauwatosa, WI (US); Diane M. Strelow, Wauwatosa, WI (US); Chongyao Zhang, Shorewood, WI (US); Mark A. Gibes, Port Washington, WI (US)

(73) Assignee: Bostik, Inc., Wauwatosa, WI (US)

( * ) Notice: Subject to any disclaimer, the term of this patent is extended or adjusted under 35 U.S.C. 154(b) by 0 days.

(21) Appl. No.: 10/282,168

(22) Filed: Oct. 28, 2002

(65) Prior Publication Data

US 2004/0081795 A1    Apr. 29, 2004

(51) Int. Cl.
```
C08F 8/00      (2006.01)
C08L 23/00     (2006.01)
C08L 23/04     (2006.01)
C08L 25/02     (2006.01)
C09D 11/02     (2006.01)
C09J 7/02      (2006.01)
B29C 47/00     (2006.01)
```
(52) U.S. Cl. .............. 525/191; 525/232; 525/240; 525/241; 524/13; 524/270; 524/271; 524/274; 524/275; 524/425; 524/444; 524/445; 524/449; 524/451

(58) Field of Classification Search ........... 525/191, 525/232, 240, 241; 524/13, 270, 271, 274, 524/275, 425, 444, 445, 449, 451
See application file for complete search history.

(56) References Cited

U.S. PATENT DOCUMENTS

| | | | |
|---|---|---|---|
| 4,022,728 A | 5/1977 | Trotter et al. | |
| 4,120,916 A | 10/1978 | Meyer et al. | |
| 4,330,645 A | 5/1982 | Juza et al. | 526/61 |
| 4,761,450 A | 8/1988 | Lakshmanan et al. | 524/488 |
| 4,857,594 A * | 8/1989 | Lakshmanan et al. | 525/98 |
| 5,317,070 A * | 5/1994 | Brant et al. | 526/348.5 |
| 5,476,914 A | 12/1995 | Ewen et al. | 526/351 |
| 5,478,891 A | 12/1995 | Lakshmanan et al. | 525/240 |
| 5,618,895 A | 4/1997 | Kerth et al. | 526/128 |
| 5,723,546 A | 3/1998 | Sustic | 525/240 |
| 5,747,573 A | 5/1998 | Ryan | 524/270 |
| 5,789,502 A | 8/1998 | Shamshoum et al. | 526/129 |
| 5,804,519 A * | 9/1998 | Riswick et al. | 442/392 |
| 6,329,468 B1 * | 12/2001 | Wang | 525/240 |
| 6,380,292 B1 * | 4/2002 | Gibes et al. | 524/318 |
| 6,482,281 B1 * | 11/2002 | Schmidt | 156/108 |
| 6,486,246 B1 * | 11/2002 | Vion | 524/271 |
| 6,653,385 B1 * | 11/2003 | Wang et al. | 524/425 |
| 6,664,309 B1 * | 12/2003 | Svenningsen et al. | 523/122 |
| 2002/0007033 A1 | 1/2002 | Karandinos et al. | |

FOREIGN PATENT DOCUMENTS

| | | |
|---|---|---|
| EP | 1344642 | 9/2003 |
| WO | WO 94/04625 | 3/1994 |
| WO | WO 01/46277 | 6/2001 |
| WO | WO 01/53408 | 7/2001 |
| WO | WO 01/81493 | 11/2001 |
| WO | WO 03/033612 | 4/2003 |

* cited by examiner

*Primary Examiner*—Nathan M. Nutter
(74) *Attorney, Agent, or Firm*—Andrus, Sceales, Starke Sawall, LLP (57) ABSTRACT

A hot melt adhesive composition is based on an isotactic polypropylene random copolymer (RCP). The composition contains about 4%–50% by weight of the RCP copolymer, about 20%–65% by weight of a compatible tackifier, about 0%–40% by weight of a plasticizer, about 0%–3% by weight of a stabilizer, about 0%–40% by weight of a wax, and optionally about 0%–60% by weight of an atactic poly-α-olefin (APAO). The adhesive composition may be used in a number of applications such as, for example, in disposable nonwoven hygienic articles, paper converting, flexible packaging, wood working, carton and case sealing, labeling and other assembly applications.

18 Claims, 2 Drawing Sheets

HOT MELT ADHESIVE COMPOSITION BASED ON A RANDOM COPOLYMER OF ISOTACTIC POLYPROPYLENE

FIELD OF THE INVENTION

This invention relates to novel hot melt adhesive compositions based on stereospecific, predominately semi-crystalline isotactic polypropylene random co-polymers (RCP). More particularly, this invention relates to adhesive compositions that find utility in case/carton sealing and in manufacturing nonwoven disposable articles such as diapers and feminine hygiene products. The adhesive compositions are particularly useful as an elastic attachment and construction adhesive in assembly of disposable nonwoven articles.

BACKGROUND OF THE INVENTION

Hot melt adhesives typically exist as solid masses at ambient temperature and can be converted to a flowable liquid by the application of heat. These adhesives are particularly useful in manufacturing a variety of disposable goods where bonding of various substrates is often necessary. Specific applications include disposable diapers, hospital pads, feminine sanitary napkins, pantyshields, surgical drapes and adult incontinent briefs, collectively known as disposable nonwoven products. Other diversified applications have involved paper products, packaging materials, tapes and labels. In most of these applications, the hot melt adhesive is heated to its molten state and then applied to a substrate. A second substrate is immediately brought into contact with and compressed against the first. The adhesive solidifies on cooling to form a strong bond. The major advantage of hot melt adhesives is the absence of a liquid carrier, as would be the case of water or solvent based adhesives, thereby eliminating the costly process associated with solvent removal.

For many applications, hot melt adhesives are often extruded directly onto a substrate in the form of a thin film by using piston or gear pump equipment. In this case, the substrate is brought into intimate contact with a hot die under pressure. The temperature of the die must be maintained well above the melting point of the adhesive, which is typically between 150 and 200° C. For some applications, particularly for manufacturing nonwoven articles, bonding of delicate and heat sensitive substrates, such as thin gauge polyethylene films, is often involved. Direct contact between the film and the die, in these cases, must be avoided to prevent the film from burning or distorting. Several application methods have been developed through which a hot melt adhesive can be spray coated with the aid of compressed air onto a substrate from a distance. These non-contact coating techniques include spiral spray and various forms of melt-blown methods. Direct contact between the coating head and the substrate is thus eliminated. All the coating techniques herein described above are well known to those skilled in the art and commercial equipment is readily available.

The spray coating techniques, however, pose stringent requirements on hot melt adhesives. The viscosity of the adhesives must be sufficiently low, usually in the range of 2,000 to 30,000 cP, preferably in the range of 2,000 to 15,000 cP, at the application temperature. Many other physical factors, especially the rheological properties of the adhesive, come into play in determining the sprayability of a hot melt. The majority of commercial hot melt products do not lend themselves to spray applications. There are no accepted theoretical models or guidelines to predict sprayability and it must be determined empirically with application equipment.

Syndiotactic polypropylene (SPP) polymers are known in this art. The SPP polymers are essentially high molecular weight stereospecific propylene homopolymers or copolymers of propylene with other α-olefin monomers such as ethylene, butene-1 or hexene-1. The syndiotactic polymers should not be confused with the conventional crystalline polypropylenes and essentially amorphous atactic poly-α-olefins (APAO). These polymers differ from each other in both structures and properties. It is well know to those skilled in the art that the conventional crystalline polypropylenes have an isotactic molecular chain configuration. The isotactic configuration can be described as having the methyl groups attached to the tertiary carbon atoms of successive monomeric units on the same side of a hypothetical plane drawn through the main polymer chain. This type of stereochemistry structure can be illustrated graphically by using the Fisher projection formula as the follow:

Due to its high degree of chain regularity, the conventional isotactic polypropylenes (IPP) are highly crystalline with crystallinity typically greater than 50% and a heat of fusion greater than 70 J/g. They are usually stiff materials having high density and high melting point. Due to the lack of flexibility, an IPP polymer can only be used as a modifier in small amounts, typically around 2% to 5% by weight, in hot melt adhesive formulations. A typical conventional IPP usually has a melt flow rate, which is inversely related to the weight average molecular weight, in the range of 0.5 to 200 g/10 min as measured in accordance with ASTM D-1238 test method.

Another component known to be used in a hot melt adhesive composition blend comprises an APAO polymer. APAO polymers are a family of essentially amorphous low molecular weight homopolymers of propylene or copolymers of propylene with ethylene or butene or hexene. In contrast to the regular structures in IPP or SPP, APAOs have atactic molecular chains with the methyl groups on the successive monomeric units sterically randomly distributed on both sides of the hypothetical plane through the polymer chain. The stereo configuration of the atactic APAO molecular chain can be illustrated graphically by using the following Fisher projection formula:

The stereo chain structure of SPP is uniquely different from that of IPP and from that of APAO. In contrast to the isotactic chain configuration of IPP and the atactic chain configuration of APAO, the stereochemistry of SPP can be described as having the tertiary methyl groups of successive monomer units along the chain alternatively disposed on each side of the hypothetical plane. The stereo configuration of SPP can be depicted below:

The stereo configuration of polypropylene can also be characterized quantitatively through C-13 NMR. In NMR nomenclature, a "meso" dyad of successive methyl groups on the same side of the plane, as in the case of IPP, is represented by the letter m. A "racemic" dyad of successive methyl groups on the opposite sides of the plane, as in the case of SPP, is represented by the letter r. The percentage of m or r defines the degree of polymer tacticity with the sum of m and r equal to 100%. Thus, a perfect isotactic polypropylene will have 100% m dyad, whereas a perfect syndiotactic polypropylene will have 100% r dyad. This unique stereochemical structure of SPP results in an unusual and desirable combination of physical and mechanical properties such as low density, low melting point, flexibility and toughness. SPP polymers typically have an r value equal to or greater than 70% while the r values of conventional IPPs, in comparison, are generally in a few percent range.

In addition to the difference in stereochemistry, SPPs are also readily distinguishable from IPPs and APAOs by their unique physical properties. Typical SPPs will have a melting point between 130 to 160° C., whereas crystalline IPPs typically have a melting point about 176° C. APAOs, on the other hand, are usually predominately amorphous without a well-defined melting point although some grades of commercial products may exhibit very low degree of crystallinity. Another profound difference between SPP and IPP and APAO lies in their densities. The density of SPP is typically between 0.86 to 0.90 g/cm$^3$, which is in between those of IPP and APAO. IPPs have the highest density ranging from 0.90 to 0.95 g/cm$^3$ and APAOs, the lowest ranging from 0.85 to 0.87 g/cm$^3$.

Due to their high melting point, high degree of crystallinity and the lack of desirable physical and mechanical attributes such as flexibility and toughness, the conventional IPPs have not been used alone as the polymer base for hot melt adhesive applications. A hot melt adhesive based on IPP would be too brittle to offer acceptable bond strength and yet would require high application temperature that goes well beyond the melting point of the polymer.

Hot melt adhesives containing APAOs, APAO/polyethylene (PE) blends, APAO/polybutene (PB) blends, or APAO/IPP blends are known in the art. These adhesives typically consist of an APAO, or an APAO blend herein mentioned above, and a hydrocarbon type of tackifier. It is well know that adhesives based on APAOs generally have poor cohesive strength, poor heat resistance, low elevated temperature bond strength and low shear values. APAOs have not found much use in disposable nonwovens applications where a combination of high bond strength at very low coating weight and easy processability by spray techniques is required. The APAO based adhesives usually lack such capabilities. Although various attempts were made to address these problems by blending APAO with PE, PB and the conventional IPP, very often such modifications not only failed to rectify the problems, but also led to adverse side effects.

For example, Trotter et al, in U.S. Pat. No. 4,022,728, describes a hot melt pressure sensitive composition comprising a mixture of APAOs, a low molecular weight substantially amorphous elastomer, a liquid tackifier and a conventional crystalline polypropylene (IPP) in the amount of up to 2% by weight. It is claimed that the composition provides good adhesive properties at low temperatures.

Meyer et al, in U.S. Pat. No. 4,120,916, discloses hot melt adhesive compositions comprising a blend of low molecular weight polyethylene, low molecular weight conventional propylene containing polymer and APAO. These adhesive compositions are said to offer short open time and to be useful for bonding of paraffin modified corrugated board.

Lakshmanan et al, in U.S. Pat. No. 4,761,450, discloses a polymer blend useful as hot melt adhesive comprising a low density ethylene polymer, a copolymer of butene-1 with ethylene or propylene, a hydrocarbon tackifier and a low molecular weight polymer consisting of a low molecular weight liquid polybutene, an amorphous polypropylene and mixtures thereof.

Lakshmanan et al, in U.S. Pat. No. 5,478,891, also discloses blend compositions containing (a) a high molecular weight copolymer of ethylene with an α-olefin having at least 4 carbons and (b) an amorphous polypropylene or amorphous polyolefin. The components of the blends are described as having molecular weight range between 300 to 6000. The polymer blends are claimed to be useful for hot melt adhesives, coatings, sealants, asphalt modifiers and plastic additives.

Ryan discloses in U.S. Pat. No. 5,747,573 an APAO based hot melt adhesive composition useful for bonding plastics and metallized foil containers. The adhesive composition contains a blend of APAO, a solid benzoate plasticizer and a hydrocarbon tackifier.

Sustic, in U.S. Pat. No. 5,723,546, discloses a polymer blend consisting of a high molecular weight average, predominantly atactic flexible polyolefin polymer and a low molecular weight average APAO. The blend is said to be useful for hot melt adhesives.

Blending APAO with PE, PB or the conventional IPP leads to several drawbacks. The prior art adhesives containing APAO/PE or APAO/PB blends, such as, for example, those described herein above in U.S. Pat. Nos. 4,120,916, 4,761,450, and 5,478,891, tend to have poor compatibility. These adhesives can undergo phase separation during application process at which the hot melt adhesives have to be kept in the molten state at high temperature for a prolonged period of time, sometimes for hours or even days. Charring, skinning and gelling can develop rather quickly in the phase separated hot melt adhesives, thereby causing the application equipment to block or plug-up. The incompatibility of such polymer blends also imparts brittleness, optical haziness, poor or no open time, and low bond strength. Although APAO and the conventional IPP blend based hot melts do not have the compatibility problems, they still suffer from all the other drawbacks herein described above. Moreover, due to high crystallinity and high melting point of the conventional IPP polymers, hot melt adhesives based on APAO/IPP blends tend to be hard and brittle unless the IPP polymer amount is kept at a very low level, such as, for example, at about or below 2% by weight as disclosed in the prior art U.S. Pat. No. 4,022,728. As a result, these adhesives will have poor tensile strength, poor bond strength and poor impact resistance. Another detrimental effect of IPP is the increased coating temperature. The adhesive must be heated above the melting point of IPP (ranging from 180 to 200° C.) for it to reach a liquid state. The blend of high and low molecular weight atactic polyolefin approach described in U.S. Pat. No. 5,723,546, although offering some improvement on tensile properties of APAO, has not been able to provide sufficient tensile strength and high temperature properties to overcome the deficiencies of sole APAO based hot melts.

In a prior U.S. Pat. No. 5,317,070, Brant et al disclosed a hot melt adhesive based on tackified SPP having a polymer chain of at least 80% racemic dyads and having a melting point of about 100 to 180° C. The adhesive is claimed to have good open times between the application of the adhesive and the formation of the joint. This type of tackified SPP usually lacks flexibility and toughness, and therefore, will also have poor bond strength and poor impact resistance. Furthermore, SPP exhibits an inherent shrinkage problem when it transforms from liquid to solid crystalline state. The shrinkage often causes stress concentration at adhesive/substrate interfaces, and consequently, catastrophic bond failure.

It therefore would be advantageous to provide a hot melt adhesive that will overcome the shortcomings of the prior art adhesives herein mentioned above.

With the advancement in recent years of catalyst technology in the manufacturing of polyolefins, especially with the newly developed single-site catalyst systems such as metallocenes, entirely new types of flexible, low melting point and low crystallinity random propylene copolymers (RCP) have been developed. The art of single-site metallocene catalysts is a subject of numerous publications, such as, for example, U.S. Pat. Nos. 5,387,568, 5,393,851, 5,416,228, 5,476,914 to Ewen et al, and U.S. Pat. No. 5,789,502 to Shamshoun et al. Compared with conventional IPPs, the RCP copolymers usually have better flexibility, better impact resistance, lower density, much depressed melting point and lower crystallinity; these are the characteristics favoring hot melt adhesive applications. It is discovered in the present invention that RCP copolymers based on propylene and α-olefins can be advantageously used to overcome the drawbacks of IPP, SPP and APAO in hot melt adhesives to provide well balanced properties of cohesive strength and adhesive strength. Most importantly, the present invention provides a hot melt composition that can be easily processed with a variety of conventional hot melt coating equipment.

SUMMARY OF THE INVENTION

The present invention is directed to a hot melt adhesive composition based on a low melting point isotactic polypropylene random copolymer (RCP) which comprises a random copolymer of propylene and an α-olefin having the formula R—CH═CH$_2$ where R is a hydrogen or a C$_2$ to C$_{10}$ alkyl group, preferably ethylene. The useful polymers for the present invention will contain at least 1.5% by weight of the said α-olefin comonomer, and having a melting point of 145° C. or lower, as measured by DSC method, a melt flow rate of 1 to 500 g/10 min. per ASTM Method D-1238, and a solid density of 0.880 to 0.905 g/cc per ASTM Method D-1505.

The adhesive comprises, in addition to the RCP copolymer, a tackifying resin, an optional plasticizer, an optional APAO, and an optional wax as the primary ingredients. The composition of the present invention takes advantage of the desirable properties of RCP and has overcome the shortcomings of the prior art APAO blend adhesives and tackified SPPs. The composition of the present invention provides well balanced properties of tensile strength, toughness, flexibility and adhesion. It shows complete compatibility, excellent heat stability, adjustable open time, improved cohesive strength, low viscosity, low shrinkage upon solidification, low or no tack when set, and good processibility with conventional coating equipment. In particular, the present invention leads to an adhesive composition that is well suited for a variety of spray coating application techniques, such as, for example, spiral spray, melt-blown, control coat, control wave and the like, whereas the prior art APAO and SPP based adhesives lack such broad processibility.

The above advantages are a result of the semi-crystalline structure of the RCP random copolymer. This type of stereochemical structure can be described as having the methyl groups attached to the carbon atoms of successive monomeric units on the same side of a hypothetical plane drawn through the main polymer chain with the α-olefin randomly located along the chain. Such a structure can be illustrated graphically as follows:

The addition of an α-olefin, preferably ethylene, in a random pattern reduces the crystallinity of the polymer, and thus lowers the melting point as well as slowing the rate of crystallization. As it has been pointed out hereinabove, the crystallization rate of a polymer is a critical factor affecting open time of the hot melt adhesive. In contrast to conventional isotactic polypropylenes (IPP) which give essentially no open time due to their fast crystallization rate, RCPs can be formulated to have workable open times, thereby overcoming the major hurdle of IPPs for hot melt adhesives. The open time of RCP based hot melt adhesive can be adjusted through formulation to meet the requirements of various bonding applications. As such an RCP copolymer can be used by itself in a lotion resistant disposable diaper, in carton/case sealing applications, or can be blended with other polymers such as APAO for elastic attachment or construction of nonwoven hygienic article assembly.

Although any RCP polymer of the type described hereinabove can be used in the composition of the present invention, a sub-group of metallocene catalyzed random copolymers, which will be referred to as mRCPs, are found to be the most useful and therefor most preferred. Compared with regular RCP polymers, mRCPs offer additional benefits of narrow molecular weight distribution, narrow compositional distribution and even comonomer distribution along its molecular chain. At the same level of α-olefin comonomer content, mRCPs exhibit lower density, lower melting point and lower crystallinity than their regular RCP counterparts. These unique characteristics can greatly improve the handling of the polymer during compounding on one hand and enhance performance of hot melt adhesives on the other. The mRCP copolymers are especially desirable for hygienic nonwoven applications where low application temperature is a critical requirement to avoid substrate burn-through or distortion, and where broad application latitude through various non-contact coating techniques is also essential. In these regards, the mRCP polymers are capable of providing adhesive compositions having low softening point and low melt viscosity, thereby enabling low coating temperature. Moreover, due to their low density and low crystallinity, the mRCP polymers usually exhibit compatibility with other formulation ingredients, permitting the use of a broad range of raw materials in varying ratios.

One of the prominent features of the hot melt adhesive composition of the present invention is its ability to provide a strong bond to a variety polar and nonpolar substrates at very low coating weight. The adhesive works well on both porous and film substrates. At the equal coating weight, the present adhesive will yield a much higher peel adhesion value than the prior art adhesives. The ability to yield high peel strength at low coating weight enables the end user to use less adhesive, which is obviously a great cost benefit.

One objective of the present invention is to provide an adhesive that has very low or no tack at ambient temperature. This feature is particularly advantageous for use on porous substrates where adhesive bleed-through and the subsequent blocking are of great concern. Blocking is especially disastrous in the manufacturing of roll-goods. The roll goods are usually intermittent products that will be converted to end products in a subsequent process. Roll blocking makes it difficult, and sometimes even impossible to unwind the roll in the subsequent converting process. The non-tacky characteristic of the present adhesive in combination with low coating weight capability will eliminate the blocking problem.

Another objective of the present invention is directed towards a sprayable hot melt adhesive for construction of disposable nonwoven articles for binding polyethylene, polypropylene films, nonwoven fabrics and the like to each other and to themselves. The adhesive provides excellent peel strength and bond durability in such application.

Another objective of the present invention is to provide a sprayable hot melt for elastic attachment application in manufacturing baby diapers, adult incontinent briefs and the like for binding elastic strands between a polyethylene film and a nonwoven fabric, or between two nonwoven fabrics. This type of adhesive can be formulated to have dual functions for both elastic attachment and construction.

Another objective of the present invention is to provide a hot melt adhesive that has high bond strength retention when contacted with an emollient such as mineral oil.

Another objective of the present invention is to provide a hot melt adhesive for carton and case sealing to provide a strong bond. Due to its toughness and flexibility, an RCP/APAO based hot melt is advantageous for low temperature applications. The adhesive of the present invention would offer fiber tear bond at the ambient temperature.

The hot melt adhesive composition of the present invention comprises as components thereof a mixture of the following ingredients:

a. An isotactic polypropylene random copolymer (RCP) in the amount of about 4% to 50% by weight, preferably in the amount of about 5% to 40% by weight, and most preferably in an amount of from about 5% to 25% by weight, said RCP having from about 80%–98% by weight propylene and from about 2%–20% by weight of an α-olefin having the formula R—CH=CH$_2$ where R is hydrogen or a C$_2$ to C$_{10}$ alkyl group; said RCP having a preferred ratio of 94%–97% propylene and 3%–6% α-olefin with the preferred α-olefin being ethylene; said RCP having a density of about 0.88 g/cc to 0.905 g/cc and a melt flow rate of equal to or greater than 1.0 g/10 min and a melting point equal to or less than 145° C.

b. A compatible tackifier in the amount of 20% by weight to 65% by weight, preferably in the amount of 25% by weight to 60% by weight and most preferably in an amount of 30% to 60% by weight;

c. Optionally, about 0% to 60% by weight, preferably 15% to 40% by weight, and most preferably 20% to 40% by weight, of atactic poly-α-olefin (APAO), said APAO having a density of about 0.85 g/cc to 0.89 g/cc and a glass transition temperature (Tg) of from about −5 to −40° C. and weight average molecular weight (Mw) of from about 4,000 g/mol to about 150,000 g/mol.;

d. Optionally, about 0% to 40% by weight, preferably about 5% to 30% by weight, and most preferably 10% to 25% by weight of a plasticizer;

e. Optionally, about 0% to 3% by weight of a stabilizer or antioxidant; and f. Optionally, about 0% to 40% by weight, preferably about 0% to 30% by weight, and most preferably 0% to 20% weight of a wax;

the components of the composition adding up to 100% by weight. The adhesive composition may contain other components such as a filler and/or a colorant and/or a fluorescing agent and/or a surfactant and/or another polymer that can modify the adhesive properties of the above basic adhesive composition, as desired.

DETAILED DESCRIPTION OF THE INVENTION

In accordance with the present invention, a hot melt adhesive composition is produced, comprising as the primary polymer component an isotactic polypropylene random copolymer (RCP) which comprises a random copolymer of propylene and an α-olefin having the formula R—CH=CH$_2$ where R is hydrogen or a C$_2$–C$_{10}$ alkyl group, preferably ethylene. RCP is present in the adhesive composition in the amount of about 4% to 50% by weight, preferably in the amount of about 5% to 40% by weight, and most preferably in an amount of from about 5% to 25% by weight. The hot melt adhesive composition of the present invention also includes about 20% to 65% by weight, preferably about 25% to 60% by weight, and most preferably 30% to 60% by weight, of tackifier, about 0% to 40% by weight, preferably about 5% to 30% by weight, and most preferably 10% to 25% by weight, of plasticizer, about 0% to 40% by weight, preferably about 0% to 30% by weight, and most preferably 0% to 20% by weight, of wax, about 0% to 3% by weight of stabilizer or antioxidant, and about 0% to 60% by weight, preferably 15% to 40% by weight, and most preferably 20% to 40% by weight, of atactic poly-α- olefin (APAO). Optional components such as filler, colorant, blowing agent, fluorescing agent and the like can be added to the basic composition to modify its properties, as desired.

The hot melt composition of the present invention includes a RCP copolymer. The art of making CRP copolymers by using Ziegler-Natta catalysts has been disclosed in U.S. Pat. Nos. 4,330,645 and 5,618,895, and by using metallocene catalysts in U.S. Pat. No. 5,476,914 to Ewen et al and U.S. Pat. No. 5,789,502 to Shamshoun et al, the entire disclosures of which are hereby incorporated by reference. Suitable RCP polymers can be prepared by copolymerization of propylene with another different α-olefin monomer containing 2 to 10 carbon atoms, which includes, but not limited to, ethylene, butene-1, petene-1, hexane-1, 4-methyl pentene-1, and octane-1. Copolymers prepared by using metallocene catalyst are preferred. The most preferred RCP polymers are mRCPs containing ethylene or butene-1 or hexane-1 as the comonomer having a comonomer content ranging from about 2% by weight to about 20% by weight.

The RCP copolymers useful in the present invention preferably have a melting point equal to or less than 145° C., more preferably less than 125° C. and most preferably less than 120° C. The RCP copolymers generally have a density in a range from about 0.88 g/cc to about 0.905 g/cc and preferably from 0.88 g/cc to 0.89 g/cc at room temperature as measured per ASTM D-1505 test method. The polymer also has a melt flow rate (MFR), which is inversely related to weight average molecular weight Mw, equal to or greater than 1.0 g/10 min., preferably between 5–200 g/10 min. and more preferably between 7–100 g/10 min., as measured per ASTM D-1238 test method. Examples of copolymers of this type are available under trade designation EOD01-03, EOD01-04, EOD01-05, EOD01-06, and EOD01-14 from ATOFINA Petrochemicals, Inc., Houston, Tex.

The following Table 1 is a listing and comparison of the physical properties of some of the mRCP copolymers useful in the present adhesive composition:

TABLE 1

| Sample | EOD00-14 | EOD01-03 | EOD01-04 | EOD01-05 | EOD01-06 |
|---|---|---|---|---|---|
| Polymer type | mRCP | mRCP | mRCP | mRCP | mRCP |
| MFR g/10 min | 12.3 | 6.1 | 6.7 | 7.4 | 8.0 |
| X-sol, % | 0.5, 0.64* | 1.1, 1.16* | 1.5, 1.76* | 2.1, 2.6* | 4.7, 5.6* |
| Ethylene by NMR, wt. % (mole %) | 1.5 (2.3) | 2.3 (3.4) | 3.2 (4.8) | 4.7 (7.0) | 6.5 (9.4) |
| Melting Point ° C. (DSC) GPC | 139.7 | 132.7 | 128.0 | 119.4 | 111.4 |
| Mn$\times 10^3$ | 59 | 78 | 81 | 72 | 65 |
| Mw$\times 10^3$ | 173 | 234 | 239 | 229 | 212 |
| Mw/Mn | 2.9 | 3.0 | 3.0 | 3.2 | 3.3 |

The APAO component useful in the present invention consists of several different categories of atactic, low molecular weight, low melt viscosity, and substantially amorphous propylene based polymers. The term "substantially amorphous" is defined herein as having a degree of crystallinity less than 30%, as determined by differential scanning calorimetry (DSC) against a highly crystalline polypropylene standard. These polymers can be either homopolymers of propylene or copolymers of propylene with one or more α-olefin comonomer, such as, for example, ethylene, butene-1, hexene-1 and octene-1. The average weight molecular weight of the APAO polymers in the scope of the present invention is in the range of from about 4,000 to about 150,000 g/mol, preferably from about 10,000 to about 100,000 g/mol. The said polymers have advantageously a softening point between about 80 and 170° C. and a glass transition temperature from about −5 to −40° C. Although any APAO polymer falling in the range of physical properties herein described above can be used, the most preferred APAO is selected from the group consisting of propylene homopolymer, propylene-ethylene copolymer, propylene-butene-1 copolymer and propylene-ethylene-butene-1 terpolymer. The APAO polymers of the types herein described above are commercially available from Eastman Chemical Company, Kingsport, Tenn., under the trade name designation Eastoflex or from Huntsman Corporation, Houston, Tex., under the trade name designation Rextac or from Degussa Corporation, Passipanny, N.J., under the trade name designation Vestoplast. As noted, 0% to 60% by weight APAO may be blended into the adhesive composition, preferably 15% to 40% by weight, and most preferably 20% to 40% by weight.

The tackifying resins or tackifiers which are used in the hot melt adhesives of the present invention are those which extend adhesive properties and improve specific adhesion. As used herein, the term "tackifying resin" include:

(a) aliphatic and cycloaliphatic petroleum hydrocarbon resins having Ring and Ball softening points of from 10° C. to 160° C., as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are Piccotac 95 tackifying resin sold by Eastman Chemical Company, and Escoreze 1310LC sold by ExxonMobil Chemical Company;

(b) Aromatic petroleum hydrocarbon resins and the hydrogenated derivatives thereof;

(c) Aliphatic/aromatic petroleum derived hydrocarbon resins and the hydrogenated or acid functionalized derivatives thereof;

(d) Aromatic modified cycloaliphatic resins and the hydrogenated derivatives thereof;

(e) Polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) Copolymers and terpolymers of natural terpenes, e.g. styrene/terpene, α-methyl styrene/terpene and vinyl toluene/terpene;

(g) natural and modified rosin such as, for example, gun rosin, wood rosin, tall-oil rosin, distilled rosin, hydrogenated rosin, dimerized rosin and polymerized rosin;

(h) glycerol and pentaerythritol esters of natural and modified rosin, such as, for example, the glycerol ester of pale wood rosin, the glycerol ester of hydrogenated rosin, the glycerol ester of polymerized rosin, the pentacrythritol ester of pale wood rosin, the pentaerythritol ester of hydrogenated rosin, the pentaerythritol ester of tall-oil rosin, and the phenolic modified pentaerythritol ester of rosin;

(i) phenolic-modified terpene resins such as, for example, the resin product resulting from the condensation in an acidic medium of a terpene and a phenol;

Mixtures of two or more of the above described tackifying resins may be required for some formulations. Although a range of 20% to 65% by weight tackifying resin may be used, the preferred amount is from about 25% to about 60% by weight, and the most preferred amounts range from 30% to 60% by weight. Tackifying resins which are useful for the present invention can perhaps include polar tackifying resins, however, the choice of available polar tackifying resins is limited in view of the fact that many of the polar resins appear only partially compatible with metallocene catalyzed polypropylene mRCP copolymers and APAO polymers.

As noted above, tackifying resins which are useful within the scope of the present invention comprise about 20% to 65% by weight. Preferably, the tackifying resins can be selected from any of the nonpolar types, which are commercially available. Preferred resins are aliphatic petroleum hydrocarbon resins examples of which are based on C5 olefins such as Piccotac 9095 (formerly Hercotac 1148) available from Eastman Chemical Company, Kingsport, Tenn. Most preferred are nonpolar products which are hydrogenated DCPD based or aromatically modified derivatives thereof with softening points above 70° C. Examples of such resins are Escoreze 5400 and Escoreze 5600 sold by ExxonMobil Chemical company.

A plasticizer can be present in the composition of the present invention in amounts of 0% to about 40% by weight, preferably from about 5% to about 30%, and most preferably 10% to 25% by weight, in order to provide desired viscosity control and to impart flexibility. A suitable plasticizer may be selected from the group which includes the usual plasticizing oils, such as mineral oil, but also olefin oligomers and low molecular weight polymers, as well as vegetable and animal oils and derivatives of such oils. The petroleum derived oils which may be employed are relatively high boiling materials containing only a minor proportion aromatic hydrocarbons. In this regard, the aromatic hydrocarbons should preferably be less than 30% and more particularly less than 15% of the oil, as measured by the fraction of aromatic carbon atoms. More preferably, the oil may be essentially non-aromatic. The oligmers may be polypropylenes, polybutenes, hydrogenated polyisoprenes, hydrogenated polybutadiens, or the like having average molecular weight between about 350 and about 10,000. Suitable vegetable and animal oils include glycerol esters of the usual fatty acids and polymerization products thereof. Other useful plasticizers can be found in the families of conventional dibenzoate, phosphate, phthalate esters, as well as esters of mono- or polyglycols. Examples of such plasticizers includes, but are not limited to dipropylene glycol dibenzoate, pentaerythritol tetrabenzoate, 2-ethylhexyl diphenyl phosphate, polyethylene glycol 400-di-2-ethylhexoate; butyl benzyl phthalate, dibutyl phthalate and dioctylphthalate. The plasticizers that finds usefulness in the present invention can be any number of different plasticizers but the inventors have discovered that mineral oil and liquid polybutenes having average molecular weight less than 5,000 are particularly advantageous. As will be appreciated, plasticizers have typically been used to lower the viscosity of the overall adhesive composition without substantially decreasing the adhesive strength and/or the service temperature of the adhesive as well as to extend the open time and to improve flexibility of the adhesive.

Waxes can be used to reduce the melt viscosity of the hot melt adhesive composition. Although amounts varying from about 0% to 40% by weight may be used in the composition of the present invention, the preferred amounts are between 0% to 30% by weight, and most preferably between 0% to 20% by weight. These waxes can also effect the set-up time and the softening point of the adhesive. Among the useful waxes are:

1. low molecular weight, that is, number average molecular weight (Mn) equal to 500–6000, polyethylene having a hardness value, as determined by ASTM method D-1321, of from about 0.1 to 120, having an ASTM softening point of from about 65° C. to 140° C.;
2. petroleum waxes such as paraffin wax having a melting point of from about 50° C. to 80° C. and microcrystalline wax having a melting point of from about 55° C. to 100° C., the latter melting points being determined by ASTM method D127-60;
3. synthetic waxes made by polymerizing carbon monoxide and hydrogen such as Fischer-Tropsch wax; and
4. polyolefin waxes. As used herein, the term "polyolefin wax" refers to those polymeric or long-chain entities comprised of olefinic monomer units. This type of materials are commercially available from Eastman Chemical Co. under the trade name designation "Epolene". The materials which are preferred for use in the composition of the present invention have a Ring and Ball softening point of from about 100° C. to 170° C. As should be understand, each of these wax diluents is solid at room temperature.

Other substances which include hydrogenated animal, fish and vegetable fats and oils such as hydrogenated tallow, lard, soya oil, cottonseed oil, castor oil, menhadin oil, cod liver oil, and the like, and which are solid at the room temperature by virtue of their being hydrogenated, have also been found to be useful with respect to functioning as a wax diluent equivalent. These hydrogenated materials are often referred to in the adhesive industry as "animal or vegetable waxes".

The present invention may include a stabilizer in an amount of from about 0% to about 3% by weight. Preferably from about 0.1% to 1% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl) benzene;
pentaerythirtol tetrakis-3(3,5-di-tert-butly-4-hydroxyphenyl) propionate;
n-octadecyl-3(3,5-di-tert-butyl-4-hydroxyphenyl) propionate;
4,4'-methylenebis(4-methyl-6-tert butylphenol);
2,6-di-tert-butylphenol;
6-(4-hydroxyphenoxy)-2,4-bis(n-ocytlthio)-1,3,5-triazine;

2,3,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-3(3,5-di-tet-butyl-4-hydroxy-phenyl) propionate.

Especially preferred as a stabilizer is pentaerythritol tetrakis-3(3,5-di-tertbutyl-4-hydroxyphenol) propionate.

The performance of these stabilizers may be further enhanced by utilizing, in conjunction therewith; (1) synergists such as, for example, thiodipropionate esters and phosphites; and (2) chelating agents and metal deactivators such as, for example, ethylenediaminetetraacetic acid, salts thereof, and disalicylalpropylenediimine.

It should be understood that other optional additives may be incorporated into the adhesive composition of the present invention in order to modify particular physical properties. These may include, for example, such materials as inert colorants (e.g. titanium dioxide), fluorescent agents, 0% to 60% by weight fillers, surfactants, other types of polymers, etc. Typical fillers include talc, calcium carbonate, clay, silica, mica, wollastonite, feldspar, aluminum silicate, alumina, hydrated alumina, glass microspheres, ceramic microspheres, thermoplastic microspheres, baryte and wood flour. Surfactants are particularly important in adhesives for use in hygienic disposable nonwovens because they can dramatically reduce the surface tension, for example, of the adhesive applied to diaper core, thereby permitting quicker transport and subsequent absorption of urine by the core.

A surfactant can be present in the composition of the present invention in amounts of from about 0.1% to about 30%, by weight, and preferably from about 1% to about 10% in order to make the adhesive more hydrophilic. The surfactant preferably has a hydrophile-lipophile balance (HLB) number of less than 15. The HLB of a surfactant is an expression of its hydrophile-lipophile balance, i.e. the balance of the size and strength of the hydrophilic (water-loving or polar) and the lipophilic (oil-loving or non-polar) groups of the surfactant. All surfactants consist of a molecule that combines both hydrophilic and lipophilic groups.

The surfactant must be reasonably compatible with the other raw materials used in the hot melt adhesive so that it does not adversely affect the performance of the adhesive. On the other hand, the surfactant must "bloom" to the surface of the adhesive so as to make the adhesive more hydrophilic. Thus, a delicate balance of compatibility must be maintained. The surfactant also should not contain any water or other solvents making it processable in hot melt mixing equipment and non-toxic for the end user. The surfactant also must be sufficiently stable and non-volatile to allow processing in hot melt manufacturing and application equipment without effect on the adhesive.

As used herein the term "surfactant" or "surface-active agent" refers to any compound that reduces surface tension when dissolved in water or water solutions, or which reduces interfacial tension between two liquids, or between a liquid and a solid. Examples of suitable surfactants include, but are not limited to, the following:

(1) Fatty acid esters such as glycerol esters, PEG esters, and sorbitan esters, including ethylene glycol distearate, ethylene glycol monostrearate, glycerol mono and/or dioleate, PEG dioleate, PEG monolaurate, sorbitan monolaurate, sorbitan trioleate, etc. These surfactants are available from ICI, Thone-Poulenc, and other sources.

(2) Nonionic ethoxylates such as alklyphenol ethoxylates, alcohol ethoxylates, alkylamine ethoxylates, etc., including octylphenol ethoxylate, nonylphenol ethoxylate, alkylamine ethoxylates, etc. These surfactants are available from Rhone-Poulenc, Union Carbide, and other sources.

(3) Nonionic surfactants such as 2,4,7,9-tetramethyl-5-decyn-4,7-diol available from Air Products.

(4) Ethylene oxide/Propylene oxide copolymers which are available from Union Carbide, BASF, etc. It should be noted that these and other surfactants can be blended if necessary to produce the best blend of hydrophilic performance properties.

Atmer 688, a nonionic surfactant blend, and Alkamuls GMS/C a glycerol monostearate, both manufactured by ICI Americas, Inc. have been found to be preferred surfactants for use in the present adhesive composition.

The hot melt adhesive composition of the present invention may be formulated using any of the mixing techniques known in the art. A representative example of the prior art mixing procedure involves placing all the components, except the RCP polymer, in a jacketed mixing kettle equipped with a rotor, and thereafter raising the temperature of the mixture to a range from 160° C. to 200° C. to melt the contents. It should be understood that the precise temperature to be used in this step would depend on the melting points of the particular ingredients. The RCP copolymer and/or other polymers (e.g. APAO) are subsequently introduced to the kettle under agitation and the mixing is allowed to continue until a consistent and uniform mixture is formed. The content of the kettle is protected with inert gas such as carbon dioxide or nitrogen during the entire mixing process.

The resulting hot melt adhesives may be then applied to substrates using a variety application technique. Examples includes hot melt glue gun, hot melt slot-die coating, hot melt wheel coating, hot melt roller coating, melt blown coating, spiral spray and the like. In a preferred embodiment, the hot melt adhesive is sprayed onto a substrate using spiral spray, which is a preferred technique to produce a filamentary spiral pattern for elastic attachment and construction in diaper manufacturing. In one example, a hot melt coater is equipped with a disc like coating die which has a nozzle tip in the center. The tip is surrounded with a series of inclined orifices for hot air jets to pass through. The hot melt adhesive is pumped out of the nozzle in the form of a fine filament. The filament is then rotated by high-velocity hot air jets coming out of the orifices, thereby producing a helical pattern from a single strand of adhesive. It is not the intent of this invention to provide a full description of spray techniques and the details can be found in the literature.

The adhesive composition of the present invention may be used in a number of applications such as, for example, in disposable nonwoven hygienic articles, paper converting, flexible packaging, wood working, carton and case sealing, labeling and other assembly applications. Particularly preferred applications include disposable diaper and feminine sanitary napkin construction, diaper and adult incontinent brief elastic attachment, diaper and napkin core stabilization, diaper backsheet lamination, industrial filter material conversion, surgical gown and surgical drape assembly, etc.

Tests and Materials

Brookfiled viscosity was tested according to ASTM D-3236 Method at 325° F.

Ring & Ball softening point was determined with an automated Herzog unit according to ASTM E-28 method.

Peel strength was measured in 180° geometry with a tensile tester (Instron Model 55R1122) in the controlled atmospheric environment (20° C. and 50% relative humidity). Prior to the test, the specimens were conditioned at the controlled environment for approximately 12 hours to ensure the reproducibility and accuracy of the data. The test was done at a cross-head speed of 12"/min. The average peel value of six replicates, normalized to g/in unit, was reported as the peel strength.

Creep Resistance test was carried out with the laminated specimens of the Examples herein later described. The specimen, cut to about 350 mm in length, was stretched out completely and its ends were securely attached to a piece of rigid corrugated paperboard. A length of 300 mm was marked and the elastic strands were cut at the marks. The specimen was then placed in an air-circulating oven at 100° F. Under these conditions, the elastic strands under stretch can retreat to a certain distance. The distance between the ends was measured after four hours. The ratio of the final length to the initial length, defined as Creep Retention and expressed in percentage (%), is a measure of the ability of the adhesive to hold the elastic strands.

Sprayability was measured empirically on a Meltex CT225 (Nordson) hot melt coater. The coating conditions varied depending on the adhesive sample.

EOD01-06 is a propylene-ethylene copolymer type of mRCP prepared by using a single-site metallocene catalyst system such as that disclosed in U.S. Pat. No. 5,476,914. The copolymer contains about 6% by weight of ethylene and is commercially available from AtoFina Petrochemicals, Inc., Houston, Tex. It has a density of 0.89 g/cc and a DSC melting point of 111.4° C., and has a melt flow rate of about 8 g/10 min. as determined by using ASTM Method D-1238.

EOD00-14 is a propylene-ethylene copolymer type of mRCP prepared by using a single-site metallocene catalyst system such as that disclosed in U.S. Pat. No. 5,476,914. The copolymer contains about 2% by weight of ethylene and is commercially available from AtoFina Petrochemicals, Inc., Houston, Tex. It has a density of 0.90 g/cc and a DSC melting point of 139.7° C., and has a melt flow rate of about 14 g/10 min. as determined by using ASTM Method D-1238.

EOD02-07, obtained from AtoFina Petrochemicals, is a propylene-ethylene copolymer mRCP having about 6% by weight ethylene. It has a melting point of about 112° C., a density of 0.89 g/cc and a melt flow rate of about 50 g/10 min.

EOO02-08, obtained from AtoFina Petrochemicals, is a propylene-ethylene copolymer mRCP having about 6% by weight ethylene. It has a melting point of about 112° C., a density of 0.89 g/cc and a melt flow rate of about 100 g/10 min Rextac RT2330, available from Huntsman Corporation, is an atactic propylene-ethylene copolymer type of APAO having a Brookfiled viscosity of about 3,000 cP at 190° C., a Tg of about −29° C. and a softening point of about 141° C.

Eastoflex P1010, obtained from Eastman Chemical Company, Kingsport, Tenn., is an atactic homopolypropylene type of APAO having a Brookfiled viscosity of about 1,000 cP at 190° C., a Tg of about −10° C. and a softening point of about 150° C.

Estoflex D-178, also obtained from Eastman Chemical Company, is an atactic propylene-ethylene copolymer type of APAO having a Brookfield viscosity of about 3,000 cP at 190° C., a Tg of about −27° C. and a softening point of about 130° C.

Eastoflex E-1200, also obtained from Eastman Chemical Company, is an atactic propylene-ethylene copolymer type of APAO having a Brookfiled viscosity of about 12,000 cP at 190° C., a Tg of about −28° C. and a softening point of about 135° C.

Escorez 5380, available from ExxonMobile Chemical Company, Houston, Tex., is a very light color, hydrogenated cycloaliphatic hydrocarbon tackifier having an R&B softening point of about 80° C.

Hercotac 1148 is a C5 aliphatic hydrocarbon resin having a Ring & Ball softening point of 100° C. It is available from Eastman Chemical Company.

Nyplast 222B is a mineral oil plasticizer purchased from Nynas Canada, Inc., Mississauga, Ontario, Canada.

Wingtack 10 is a liquid aliphatic C5 hydrocarbon resin having a Brookfield viscosity of about 20,000–40,000 cP at 25° C. and a Ring and Ball softening point of about 10° C. It is available from Goodyear Chemicals, Akron, Ohio.

Marcus 300, available from Marcus Oil & Chemicals, Inc., is a synthetic polyethylene wax having a melting point of about 240° F.

Irganox 1010 is a hindered phenol type of antioxidant obtained from Ciba-Specialty Chemicals, Tarryton, N.Y.

Uvitex OB, also obtained from Ciba Specialty Chemicals, is a fluorescing agent.

Lycra 740 is an elastic strand having a basis weight of 740 denier. It is available from DuPont.

Control A is a styrene-isoprene-styrene (SIS) block copolymer based hot melt adhesive having a Brookfield viscosity of 5600 cP at 350° F. and a Ring and Ball softening point of about 220° F. It is available from Bostik Findley, Inc., Wauwatosa, Wis.

SMS is a spunbond-melt blown-spunbond composition nonwoven fabric obtained from Kimberly-Clark Corporation, Neenah, Wis.

The invention is further illustrated by way of the examples which are set forth below.

EXAMPLES 1–4

Hot melt adhesive examples of 1–4 shown in Table 2 were prepared with the ingredients and mixing procedures described herein above. A total of 2000 grams each were made and the mixing was carried out at 350–375° F. under carbon dioxide atmosphere in a laboratory type of mixer what consists of a propeller powered by a motor, a heating mantle, a temperature control unit and a container of about 1 gallon in size. The appropriate amounts of each component, calculated according to the ratios shown in the table, except the mRCP copolymer were added to the container. The temperature of the container was then raised to melt the contents. After the ingredients in the container were completely melted, the motor was turned on to start agitation. Subsequently, the mRCP copolymer component was introduced, and mixed thoroughly therein. The adhesive examples 1–4 are especially useful as elastic attachment adhesive for elastic attachment applications.

Brookfield Viscosity, Ring and Ball Softening Point and Creep Retention tests were carried out on Examples 1–4 according to the procedures herein described above. The room temperature tack was judged by the adhesive's stickiness to human fingers. Specimens for Creep Retention test were formed by using spiral spray technique on Meltex CT225 hot melt coater which was fitted with a 0.018" spiral spray nozzle. To prepare the specimen, three elastic strands (Lycra 740), which were stretched to 300% elongation, were either laminated between a layer of 1.0 mil thick polyethylene film and a layer of polypropylene spunbond nonwoven fabric, or between two identical SMS nonwoven fabrics.

Figure 1A:
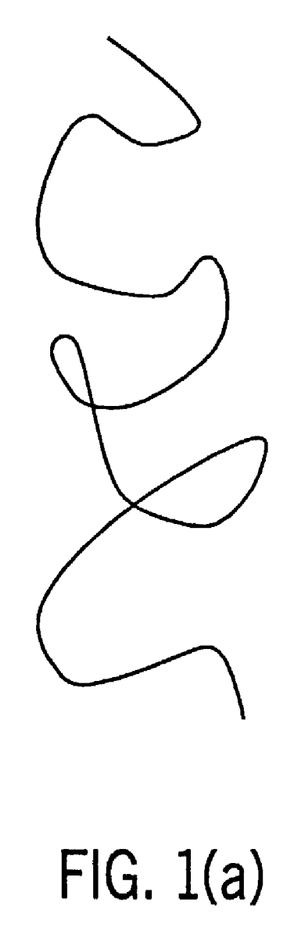
FIG. 1a illustrates schematically an undesired poor spiral spray pattern for the adhesive of the present invention.
Figure 1B:
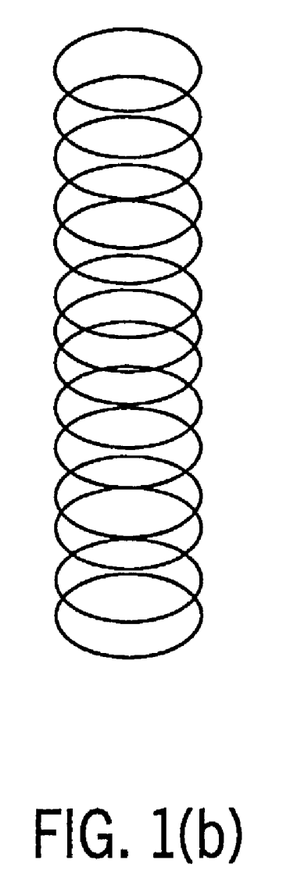
FIG. 1b illustrates schematically a desired perfect spiral spray pattern for the adhesive of the present invention.

Sprayability was evaluated during the coating process by observing the shape of the spiral pattern. The sprayability was deemed acceptable if a good spiral pattern as that depicted in FIG. 1b was observed; otherwise, it was deemed unacceptable (FIG. 1a). Adhesives were spiral sprayed at 12 g/m² coating weight with 0.25 seconds open time and 1 bar compression at the nip rolls and the application temperature was set at 325° F. The adhesives of Examples of 1–4 were found to have almost no room temperature tack, low melt viscosity, good sprayability and good creep retention properties.

TABLE 2

EXAMPLES 1–4 (ELASTIC ATTACHMENT)

| | EX 1 (wt. %) | EX 2 (wt. %) | EX 3 (wt. %) | EX 4 (wt. %) |
|---|---|---|---|---|
| EOD01-06 | 8.0 | 8.0 | 10.0 | — |
| EOD02-07 | — | — | — | 10.0 |
| Eastoflex P1010 | 30.0 | 35.5 | — | — |
| Eastoflex D178 | — | — | — | 20.0 |
| Rexflex RT 2330 | — | — | 30.0 | — |
| Wingtack 10 | 10.0 | — | — | — |
| Hercotac 1148 | 46.5 | 46.0 | 47.0 | 59.5 |
| Nyplast 222B | 5.0 | 10.0 | 12.5 | 10.0 |
| Irganox 1010 | 0.5 | 0.5 | 0.5 | 0.5 |
| Viscosity (cP), 325° F. | 2880 | 3090 | 6250 | 2090 |
| Softening Point (° F.) | 275 | 282 | 249 | 240 |
| ¹Creep retention (%) | | | | |
| Poly/Lycra/NW | 94 | 96 | 91 | 83 |
| SMS/SMS | 87 | 94 | 85 | 71 |

EXAMPLES 5–7

Examples of 5–7 were formulated by using the same procedure as herein described above with the ingredients listed in Table 3. These formulations are particularly suited as laminating adhesives for a variety flexible packaging applications and as construction adhesives for disposable nonwoven applications. When used as such, the peel strength is the most important measure of adhesive performance. The peel strength of Examples 5–7 was measured and the results were also reported in Table 3. The specimens for the peel strength measurement were prepared by laminating the same polyethylene film and polypropylene spunbond nonwoven fabric as in Examples 1–4 with spiral spray coating technique on CT225 hot melt coater equipped with three ITW controlled fiberization nozzles. The adhesive was applied in the amount of 4 g/m² at 300° F. application temperature and 0.5 seconds open time. The adhesives of Examples of 5–7 were found to have almost no or very low room temperature tack, low melt viscosity, good sprayability and good film/nonwoven bond.

TABLE 3

EXAMPLES 5–7 (CONSTRUCTION)

| | EX 5 (wt. %) | EX 6 (wt. %) | EX 7 (wt. %) |
|---|---|---|---|
| EOD01-06 | 10.0 | — | — |
| EOD02-08 | — | 15.0 | 10.0 |
| Eastoflex E-1200 | 6.0 | — | 20.0 |
| Eastoflex D178 | 9.0 | 30.0 | 10.0 |
| Hercotac 1148 | 44.5 | 34.5 | 39.5 |
| Nyplast 222B | 30.0 | 20.0 | 20.0 |
| Irganox 1010 | 0.5 | 0.5 | 0.5 |
| Viscosity (cP), 325° F. | 3750 | 3490 | 3180 |
| Softening Point (° F.) | 218 | 235 | 237 |
| Coating T (° F.) | 300 | 300 | 300 |
| ¹Peel Str. (g) | 432 | 371 | 373 |

EXAMPLES 8–9

Figure 2:
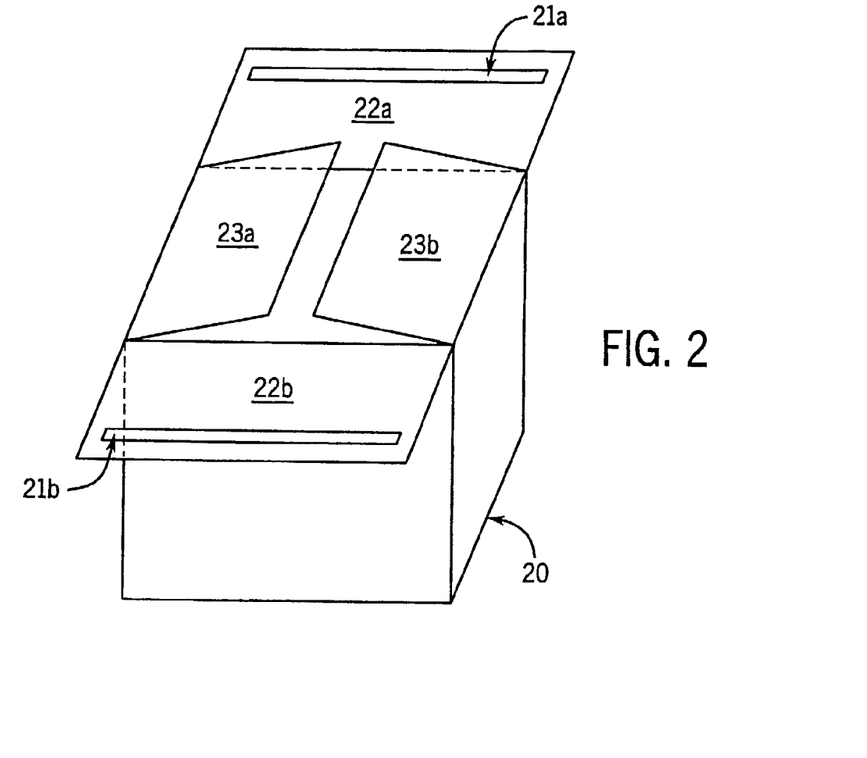
FIG. 2 illustrates a schematic perspective view of a corrugated box having the adhesive of the present invention applied to top flaps thereof.
Figure 3:
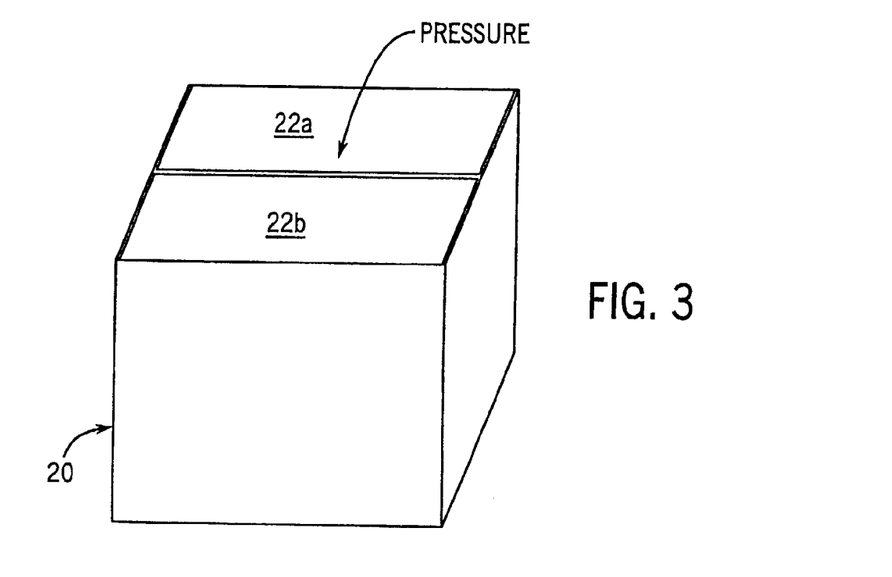
FIG. 3 illustrates the corrugated box of FIG. 2 sealed by the adhesive of the present invention.

Hot melt adhesives of Examples 8–9 were prepared by using the same procedure as herein described above with the ingredients listed in Table 4. In Examples 8 and 9 the adhesive contains a wax (Marcus 300) substituted for the APAO ingredient in the prior formulations illustrated herein. Thus, the adhesives of Examples 8 and 9 contain no APAO. A total of 250 grams each were made and the mixing was conducted at 350° F. under $CO_2$ atmosphere. They are particularly useful for case and carton sealing applications. To illustrate the use for such application, reference is made to FIGS. 2 and 3 herein where single adhesive beads of about 2 mm in diameter, illustrated as 21a and 21b in FIG. 2, was applied by hand across the upper surface of top flaps 22a and 22b of a corrugated box 20 as shown in the figure. Immediately after the adhesive application, the top flaps 22a and 22b of box 20 were folded over and brought into contact with bottom flaps 23a and 23b to seal the box 20. The flaps 22a, 22b, 23a and 23b were then held together by pressure means for approximately 2 minute to seal box 20 as shown in FIG. 3. The adhesive yielded a fiber tearing bond in about 20 minutes after the adhesive application.

TABLE 4

EXAMPLES 8–9

| | EX 9 | EX 10 |
|---|---|---|
| EOD00-14 | 15.0 | — |
| EOD02-08 | — | 30.0 |
| Marcus 300 | 18.0 | 5.0 |
| Escorez 5380 | 56.0 | 49.0 |
| Nyplast 222B | 10.0 | 15.0 |
| Irganox 1010 | 1.0 | 1.0 |
| Viscosity @ 325° F. (CP) | 3550 | 7150 |
| Softening Point (° F.) | 253 | 225 |

EXAMPLES 10–11

Examples 10–11 were formulated by using the same procedure as herein described above with the ingredients listed in Table 5. These formulations are particularly suited as lotion resistant adhesives for disposable nonwoven applications.

Manufacturers of feminine care pads, diapers and other absorbent articles may from time to time apply a coating of emollient on the skin-engaging surface of the top sheet of a disposable diaper or a coating of emollient on the skin-engaging surface of the topsheet of a feminine care pad. This emollient is intended to help prevent skin rashes that may develop during use of such articles. Petrolatum is particularly preferred because of its relatively low cost and excellent properties. Mineral oil and other oil-based ointments or lotions are also often rubbed on the skin of infants by the caregiver to treat and/or prevent skin rashes.

It is believed that emollients disturb the bond of adhesives by two mechanisms. First, they migrate into the adhesive substrate interface and thereby disrupt the bond. Second, the emollient is absorbed into and plasticizes the adhesive which reduces the cohesive strength of the adhesive. Thus, prior hot melt adhesive compositions, upon exposure thereto, experience adhesive bond failure. As a result, the elastic leg bands of a disposable diaper may actually let loose from the diaper resulting in complete failure and break down of the inner leg cuff. Also, construction adhesives may fail resulting in undesirable delamination of the absorbent article. Therefore, an adhesive that is capable of withstanding exposure to emollients while still providing sufficient bond strength would be highly desirable.

In order to determine the effectiveness against emollients, the creep resistance test was performed using the adhesives formulated according to Table 5.

The adhesives were coated on a SMS substrate, at 15 g/m² coating weight by using the spiral spray coating method herein described above. Three strands of Lycra elastics, stretched to 300% were laminated between the two identical SMS substrates. Immediately after combining the nonwoven substrates and Lycra strands to form a laminate, however, emollient was applied online at 5 g/m² coating weight and thereafter the lamination was tested for elastic creep performance. The results are reported in Table 5 below.

TABLE 5

EXAMPLES 9–10 (LOTION RESISTANT FORMULATION)

| | EX 9 (wt. %) | EX 10 (wt. %) | Control A |
|---|---|---|---|
| NO1096-C | 25 | — | |
| NO1096-D | — | 25 | |
| Hercotac 1148 | 54.5 | 54.5 | |
| Nyplast 222B | 20 | 20 | |
| Irganox 1010 | 0.5 | 0.5 | |
| Uvitex OB | 0.01 | 0.01 | |
| Viscosity (cP), 325° F. | 9050 | 5560 | |
| Softening Point (° F.) | 226 | 230 | |
| Coating T (° F.) | 375 | 350 | 350 |
| ¹Creep (%) | 84 | 85 | Delamination |

As seen, the adhesives performed exceptionally well as an elastic attachment adhesive while also providing very good creep performance after emollient exposure. In comparison, the commercial styrenic block copolymer based hot melt adhesive designated in Table 5 as Control A delaminated under the same conditions.

We claim:

1. A hot melt adhesive composition comprising a blend of the following components:
    (a) about 4% to 50% by weight of an isotactic polypropylene random RCP copolymer of propylene and at least one α-olefin comonomer having the following molecular structure:

where R is hydrogen or a $C_2$ to $C_{10}$ alkyl group, and said α-olefin comprises about 1.5% by weight to about 20% by weight of the said RCP copolymer; wherein said RCP copolymer has a density of about 0.88 g/cc to 0.905 g/cc and a melt flow rate of 1 to 500 g/10 mm and an a melting point equal to or less than 145° C.;
    (b) about 20% to 65% by weight of a tackifier;
    (c) about 0% to 60% by weight of an atactic poly-α-olefin (APAO) polymer;
    (d) about 0% to 40% by weight of a plasticizer;
    (e) about 0% to 40% by weight of a wax;
    (f) about 0% to 3% by weight of a stabilizer; and
    (g) about 0% to 60% by weight of a filler;
    the components totaling 100% by weight of the composition.

2. The composition of claim 1 wherein said RCP copolymer is an mRCP copolymer of propylene and at least one α-olefin prepared by using a metallocene catalyst system.

3. The composition of claim 1 wherein said APAO polymer has a density of about 0.85 g/cc to 0.89 g/cc and a glass transition temperature (Tg) of from about −5 to −40° C. and a weight average molecular weight (Mw) of from about 4,000 g/mol to about 150,000 g/mol.

4. The composition of claim 1 wherein the α-olefin comonomer is selected from the group consisting of ethylene, butene-1 and hexene-1.

5. The composition of claim 1 wherein the APAO polymer is a homopolymer or a copolymer of propylene and at least one α-olefin comonomer having the following molecular structure:

where R is hydrogen, or an alkyl or an aryl radical.

6. The composition of claim 5 wherein the α-olefin comonomer is selected from the group consisting of ethylene, butene-1 and hexene-1.

7. The composition of claim 1 wherein the tackifier is selected from the group consisting of aliphatic and cycloaliphatic hydrocarbon resins and their hydrogenated derivatives, aromatic and hydrogenated aromatic hydrocarbon resins, aromatically modified aliphatic or cycloaliphatic resins and their hydrogenated derivatives, polyterpene and styrenated polyterpene resins.

8. The composition of claim 7 wherein the tackifier has a R&B softening point equal to or greater than 80° C.

9. The composition of claim 8 wherein the tackifier is a C-5 aliphatic hydrocarbon resin.

10. The composition of claim 1 wherein the plasticizer is selected from the group consisting of mineral oil and liquid polybutene.

11. The composition of claim 10 wherein the mineral oil has less than 30% aromatic carbon atoms.

12. The composition of claim 1 wherein said wax is selected from the group consisting of petroleum waxes, low molecular weight polyethylene and polypropylene, synthetic waxes and polyolefin waxes.

13. The composition of claim 12 wherein the said wax is a low molecular weight polyethylene having a number average molecular weight of about 400 to about 6,000 g/mol.

14. The composition of claim 1 further including 0.1% to about 30% by weight of a surfactant.

15. The composition of claim 14 wherein the surfactant has an HLB of less than 15.

16. The composition of claim 14 wherein the surfactant is selected from the group consisting of fatty acid esters, nonionic ethoxylates and ethylene oxide/propylene oxide copolymers.

17. The composition of claim 1 wherein said filler is selected from the group consisting of talc, calcium carbonate, clay, silica, mica, wollastonite, feldspar, aluminum silicate, alumina, hydrated alumina, glass microsphere, ceramic microsphere, thermoplastic microsphere, baryte and wood flour.

18. The composition of claim 1 wherein the adhesive composition further includes a colorant.

* * * * *